(12) United States Patent
Bae et al.

(10) Patent No.: US 12,517,183 B2
(45) Date of Patent: *Jan. 6, 2026

(54) BATTERY DIAGNOSING APPARATUS, METHOD AND SYSTEM

(71) Applicant: LG Energy Solution, Ltd., Seoul (KR)

(72) Inventors: Yoon-Jung Bae, Daejeon (KR); Kyung-Hwa Woo, Daejeon (KR); A-Ming Cha, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 443 days.

This patent is subject to a terminal disclaimer.

(21) Appl. No.: 17/924,244

(22) PCT Filed: Sep. 29, 2021

(86) PCT No.: PCT/KR2021/013400
§ 371 (c)(1),
(2) Date: Nov. 9, 2022

(87) PCT Pub. No.: WO2022/071776
PCT Pub. Date: Apr. 7, 2022

(65) Prior Publication Data
US 2023/0273263 A1    Aug. 31, 2023

(30) Foreign Application Priority Data
Sep. 29, 2020  (KR) .................. 10-2020-0127289

(51) Int. Cl.
*G01R 31/389* (2019.01)
*G01R 31/388* (2019.01)
(Continued)

(52) U.S. Cl.
CPC ......... *G01R 31/389* (2019.01); *G01R 31/388* (2019.01); *G01R 31/392* (2019.01); *H01M 10/486* (2013.01)

(58) Field of Classification Search
CPC .. G01R 31/389; G01R 31/392; G01R 31/388; H01M 10/486
See application file for complete search history.

(56) References Cited

U.S. PATENT DOCUMENTS

2002/0196025 A1   12/2002  Freeman et al.
2003/0067282 A1    4/2003  Arai et al.
(Continued)

FOREIGN PATENT DOCUMENTS

CN    106004481 B  *  3/2018
JP    200519019 A      1/2005
(Continued)

OTHER PUBLICATIONS

International Search Report for Application No. PCT/KR2021/013400 mailed Jan. 24, 2022, pp. 1-3.

*Primary Examiner* — Michael J Dalbo
*Assistant Examiner* — Kaleria Knox
(74) *Attorney, Agent, or Firm* — BRYAN CAVE LEIGHTON PAISNER LLP

(57) ABSTRACT

A battery diagnosis apparatus include: an ohmic resistance determining unit configured to determine an ohmic resistance of a battery cell in each of a plurality of impedance profiles generated at different time points for the battery cell, a resistance change rate calculating unit configured to calculate a resistance change rate between the plurality of determined ohmic resistances, a gas generation level determining unit configured to determine an internal gas generation level of the battery cell based on the calculated resistance change rate, and a state diagnosing unit configured to diagnose a state of the battery cell according to the determined internal gas generation level.

12 Claims, 4 Drawing Sheets

(51) Int. Cl.
    *G01R 31/392*     (2019.01)
    *H01M 10/48*     (2006.01)

(56) References Cited

U.S. PATENT DOCUMENTS

| | | |
|---|---|---|
| 2007/0096743 A1 | 5/2007 | Arai et al. |
| 2014/0222358 A1 | 8/2014 | Morita et al. |
| 2016/0344068 A1 | 11/2016 | Kim et al. |
| 2017/0263984 A1 | 9/2017 | Fujita et al. |
| 2018/0062210 A1 | 3/2018 | Kim |
| 2018/0131054 A1* | 5/2018 | Waid ........................ H02J 50/12 |
| 2018/0175522 A1* | 6/2018 | Ogasawara .......... H01M 10/486 |
| 2019/0004120 A1 | 1/2019 | Swan et al. |
| 2019/0165586 A1 | 5/2019 | Adachi et al. |
| 2019/0198938 A1 | 6/2019 | Fujita et al. |
| 2020/0271727 A1 | 8/2020 | Bae et al. |

FOREIGN PATENT DOCUMENTS

| | | | | |
|---|---|---|---|---|
| JP | 2013214372 A | * | 10/2013 | |
| JP | 6239241 B2 | | 11/2017 | |
| JP | 6458578 B2 | | 1/2019 | |
| JP | 2019057382 A | * | 4/2019 | ............ B60L 3/0046 |
| JP | 2019103157 A | * | 6/2019 | ............ B60L 3/0046 |
| JP | 6556649 B2 | | 8/2019 | |
| JP | 6578815 B2 | | 9/2019 | |
| KR | 20160136079 A | | 11/2016 | |
| KR | 20180024545 A | * | 3/2018 | |
| KR | 20190118535 A | * | 10/2019 | |
| KR | 102152572 B1 | | 9/2020 | |
| WO | WO-2020189914 A1 | * | 9/2020 | ............. G01R 19/12 |
| WO | WO-2020189919 A1 | * | 9/2020 | ......... G01R 31/3648 |

\* cited by examiner

BATTERY DIAGNOSING APPARATUS, METHOD AND SYSTEM

CROSS-REFERENCE TO RELATED APPLICATIONS

The present application is a national phase entry under 35 U.S.C. § 371 of International Application No. PCT/KR2021/013400 filed Sep. 29, 2021, which claims priority from Korean Patent Application No. 10-2020-0127289 filed Sep. 29, 2020, all of which are incorporated herein by reference.

TECHNICAL FIELD

The present disclosure relates to a battery diagnosis apparatus, method and system, and more particularly, to a battery diagnosis apparatus, method and system capable of diagnosing a state of a battery cell.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance batteries allowing repeated charging and discharging are being actively studied.

Batteries commercially available at present include nickel-cadmium batteries, nickel hydrogen batteries, nickel-zinc batteries, lithium batteries and the like. Among them, the lithium batteries are in the limelight since they have almost no memory effect compared to nickel-based batteries and also have very low self-charging rate and high energy density.

As the battery is degraded, side reactions accompanied by generation of internal gas occur. If the side reaction continues and the amount of internal gas exceeds an allowable value, the junction portion of the battery is opened, and the battery reaches an EOL (End Of Life) state.

Therefore, in order to diagnose the state of the battery, it is required to measure the internal gas amount, but in the prior art, it is difficult to measure the internal gas amount of the battery in a non-destructive manner.

SUMMARY

Technical Problem

The present disclosure is designed to solve the problems of the related art, and therefore the present disclosure is directed to providing a battery diagnosis apparatus, method and system, which may determine an internal gas generation level of a battery based on an ohmic resistance of the battery in a non-destructive manner and diagnose a state of the battery according to the determined internal gas generation level.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery diagnosis apparatus, comprising: memory having programmed thereon instructions that, when executed by the controller, cause the battery diagnosis apparatus to: calculate a resistance change rate between ohmic resistances of the battery cell at different times, wherein the ohmic resistances are determined from respective impedance profiles of the battery generated at the different times; determine an internal gas generation level of the battery cell based on the calculated resistance change rate; and diagnose a state of the battery cell according to the determined internal gas generation level.

The instructions may be configured to cause the battery diagnosis apparatus to: determine to which of a plurality of preset reference change rate regions the calculated resistance change rate belongs, wherein the plurality of preset reference change rate regions include a first region less than a first reference resistance change rate, a second region equal to or greater than the first reference resistance change rate and less than a second reference resistance change rate, and a third region equal to or greater than the second reference resistance change rate; and determine the internal gas generation level of the battery cell based on the determined preset reference change rate region to which the calculated resistance change rate belongs.

The instructions may be configured to cause the battery diagnosis apparatus to determine that the internal gas generation level is normal in response to the calculated resistance change rate belonging to the first region, determine that the internal gas generation level is at a warning level in response to the calculated resistance change rate belonging to the second region, and determine that the internal gas generation level is at a danger level in response to the calculated resistance change rate belonging to the third region.

The instructions may be configured to cause the battery diagnosis apparatus to diagnose that the state of the battery cell is a normal state in response to the internal gas generation level being normal.

The instructions may be configured to cause the battery diagnosis apparatus to diagnose that the state of the battery cell is a warning state in response to the internal gas generation level being at the warning level and reduce at least one of a maximum allowable temperature or a maximum allowable state of charge (SOC).

The instructions may be configured to cause the battery diagnosis apparatus to diagnose that the state of the battery cell is an unusable state in response to the internal gas generation level being at the danger level.

The battery diagnosis apparatus according to another aspect of the present disclosure may further comprise: a sensor configured to measure a temperature of the battery cell and at least one of a voltage or current of the battery cell; and the instructions may be configured to cause the battery diagnosis apparatus to estimate an SOC of the battery cell based on at least one of the measured voltage or current; select at least one impedance profile from among the impedance profiles based on the temperature and the SOC of the battery cell, wherein the selected at least one impedance profile satisfies a predetermined condition, and calculate the resistance change rate based on the selected at least one impedance profile.

In the selected at least one impedance profile the temperature of the battery cell is equal to or higher than a reference temperature and the SOC of the battery cell is equal to or greater than a reference SOC.

The instructions may be configured to cause the battery diagnosis apparatus to determine a respective charge transfer resistance for each of the impedance profiles; calculate a charge transfer resistance change rate between the respective determined charge transfer resistances of corresponding impedance profiles; compare the calculated charge transfer resistance change rate and a reference resistance value; and diagnose the state of the battery cell based on the comparison.

The instructions may be configured to cause the battery diagnosis apparatus to diagnose that the state of the battery cell is a normal state in response to the calculated charge transfer resistance change rate being less than the reference resistance value.

The instructions may be configured to cause the battery diagnosis apparatus to diagnose that the state of the battery cell is a warning state in response to the calculated charge transfer resistance change rate being equal to or greater than the reference resistance value and reduce a maximum allowable current rate (C-rate) for charging and discharging of the battery cell in response to the state of the battery cell being the warning state.

A battery diagnosis system according to still another aspect of the present disclosure may comprise: the battery diagnosis apparatus according to an aspect of any of the embodiments described in the present disclosure; and an Electrochemical Impedance Spectroscopy (EIS) instrument configured to output an AC current to the battery cell, generate the impedance profiles, each impedance profile representing a relationship between real and imaginary parts of an impedance of the battery cell while the AC current is being output, and transmit the generated impedance profile to the battery diagnosis apparatus.

The battery diagnosis system according to still another aspect of the present disclosure may further comprise: a heater configured to increase a temperature of the battery cell up to or higher than a reference temperature; and a charger configured to charge the battery cell such up to or greater than a reference SOC.

A battery pack according to still another aspect of the present disclosure may comprise the battery diagnosis apparatus according to an aspect of any of the embodiments described in the present disclosure.

A battery diagnosing method according to still another aspect of the present disclosure may comprise: calculating, by a battery diagnosis apparatus, a resistance change rate between ohmic resistances of the battery cell at different times, wherein the ohmic resistances are determined from respective impedance profiles of the battery generated at the different times; determining, by the battery diagnosis apparatus, an internal gas generation level of the battery cell based on the calculated resistance change rate; and diagnosing, by the battery diagnosis apparatus, a state of the battery cell according to the determined internal gas generation level.

Advantageous Effects

According to one aspect of the present disclosure, based on the correlation between the ohmic resistance of the battery cell and the internal gas generation level of the battery cell, there is an advantage that the internal gas generation level and state of the battery cell may be diagnosed in a non-destructive manner from the resistance change rate of the ohmic resistance of the battery cell.

The effects of the present disclosure are not limited to the effects mentioned above, and other effects not mentioned will be clearly understood by those skilled in the art from the description of the claims.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise.

In addition, throughout the specification, when a portion is referred to as being "connected" to another portion, it is not limited to the case that they are "directly connected", but it also includes the case where they are "indirectly connected" with another element being interposed between them.

Hereinafter, preferred embodiments of the present disclosure will be described in detail with reference to the accompanying drawings.

Figure 1:
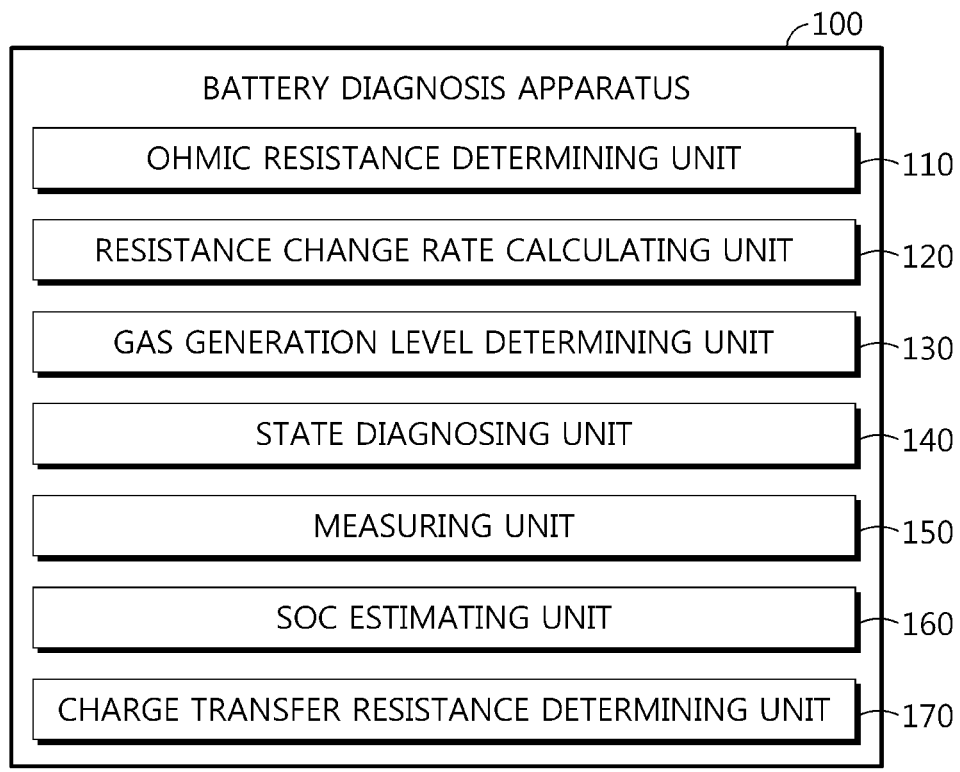
FIG. 1 is a diagram schematically showing a battery diagnosing apparatus according to an embodiment of the present disclosure.

FIG. 1 is a diagram schematically showing a battery diagnosing apparatus 100 according to an embodiment of the present disclosure.

Referring to FIG. 1, the battery diagnosis apparatus 100 may include an ohmic resistance determining unit 110, a resistance change rate calculating unit 120, a gas generation level determining unit 130, and a state diagnosing unit 140.

The ohmic resistance determining unit 110 may be configured to determine an ohmic resistance (Ro) of a battery cell in each of a plurality of impedance profiles generated at different time points for the battery cell.

Here, the battery cell refers to one independent cell that has a negative electrode terminal and a positive electrode terminal and is physically separable. For example, one pouch-type lithium polymer cell may be regarded as the battery cell.

In addition, the impedance profile may be a profile in which the impedance of the battery cell is expressed as a corresponding relationship between a real part (Zre) and an imaginary part (−Zim). The impedance profile will be described in detail with reference to FIGS. 2 and 3.

Figure 2:
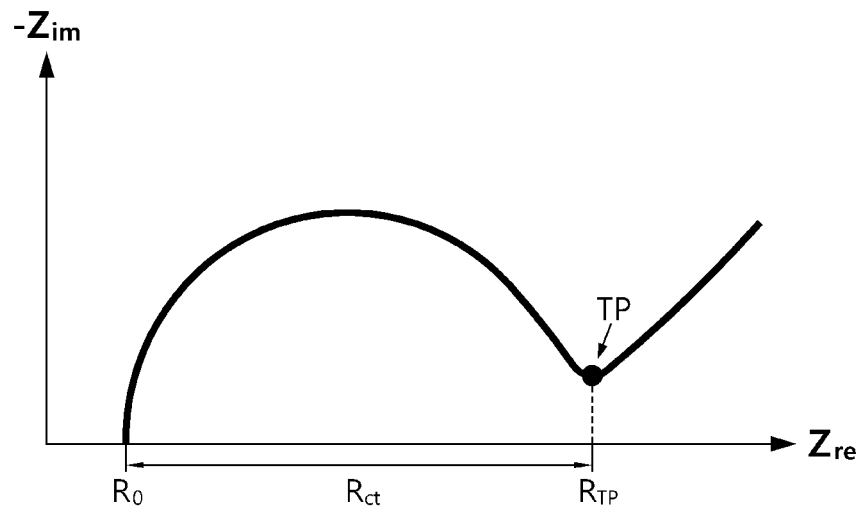
FIG. 2 is a diagram schematically showing an impedance profile according to an embodiment of the present disclosure.

FIG. 2 is a diagram schematically showing an impedance profile according to an embodiment of the present disclosure. Specifically, FIG. 2 is a diagram schematically showing an example of the impedance profile.

Referring to FIG. 2, the impedance profile may be expressed as an X-Y plane graph when X is set as a real part (Zre) and Y is set as an imaginary part (−Zim). In the embodiment of FIG. 2, the ohmic resistance of the battery cell may be a starting resistance value of the impedance profile. Specifically, in the impedance profile, the resistance value of the real part (Zre) when the value of the imaginary part (−Zim) is 0 may be the ohmic resistance of the battery cell. Since the ohmic resistance is a widely known factor, it should be noted that a description of the ohmic resistance will be omitted.

Figure 3:
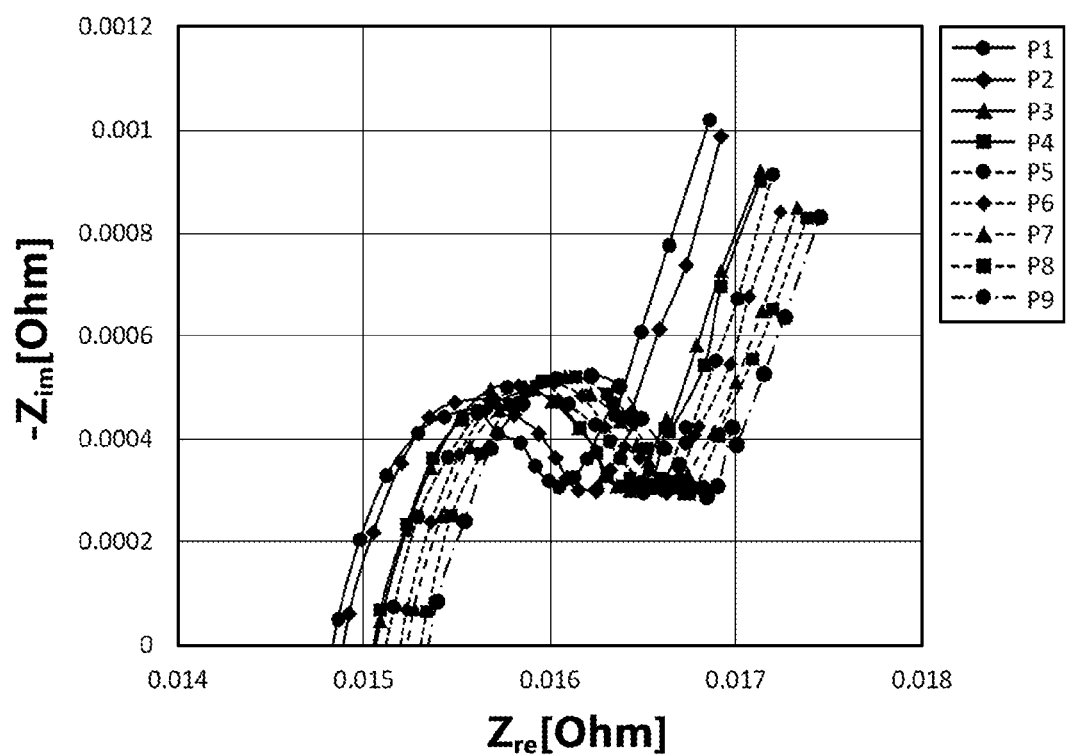
FIG. 3 is a diagram schematically showing a plurality of impedance profiles according to an embodiment of the present disclosure.

FIG. 3 is a diagram schematically showing a plurality of impedance profiles according to an embodiment of the present disclosure. Specifically, FIG. 3 is a diagram showing a plurality of impedance profiles obtained by the ohmic resistance determining unit 110.

In the embodiment of FIG. 3, the ohmic resistance determining unit 110 may obtain first to ninth impedance profiles P1 to P9. Preferably, the first to ninth impedance profiles P1 to P9 may be impedance profiles generated at different time points for one battery cell. For example, the first to ninth impedance profiles P1 to P9 are impedance profiles for impedances measured at intervals of 24 hours for one battery cell under the condition that temperature and State Of Charge (SOC) are included within a predetermined range. Here, preferably, the first impedance profile P1 may be generated first, and the ninth impedance profile P9 may be generated most recently.

In addition, in the embodiment of FIG. 3, the ohmic resistance determining unit 110 may determine the ohmic resistance in each of the first to ninth impedance profiles P1 to P9. Specifically, the ohmic resistance determining unit 110 may determine a resistance value of the real part (Zre) when the value of the imaginary part (−Zim) is 0 in each of the first to ninth impedance profiles P1 to P9 as the ohmic resistance for the corresponding impedance profile. Preferably, in the embodiment of FIG. 3, the ohmic resistance of the first impedance profile P1 may be smallest, and the ohmic resistance of the ninth impedance profile P9 may be largest.

The resistance change rate calculating unit 120 may be configured to calculate a resistance change rate between the plurality of determined ohmic resistances.

Specifically, the resistance change rate calculating unit 120 may calculate a resistance change rate between the plurality of ohmic resistances determined by the ohmic resistance determining unit 110. Preferably, the resistance change rate calculating unit 120 may calculate a resistance change rate between the plurality of ohmic resistances in consideration of time points at which the plurality of impedance profiles are generated.

For example, in the embodiment of FIG. 3, the resistance change rate calculating unit 120 may set the ohmic resistance of the first impedance profile P1 as a criterion and calculate a resistance change rate between the ohmic resistances of the first to ninth impedance profiles P1 to P9.

For example, it is assumed that the ohmic resistance of each of the first to nth impedance profiles is determined as $Ro\_1$ to $Ro\_n$ by the ohmic resistance determining unit 110. The resistance change rate calculating unit 120 may calculate a ratio of $Ro\_n$ to $Ro\_1$ as a resistance change rate. In this case, the resistance change rate calculating unit 120 may calculate the resistance change rate by calculating the formula of "$Ro\_n \div Ro\_1$".

As another example, the resistance change rate calculating unit may calculate a ratio of a difference between $Ro\_n$ and $Ro\_1$ with respect to $Ro\_1$ as a resistance change rate. In this case, the resistance change rate calculating unit 120 may calculate the resistance change rate by calculating the formula of "$(Ro\_n - Ro\_1) \div Ro\_1$".

The gas generation level determining unit 130 may be configured to determine an internal gas generation level of the battery cell based on the calculated resistance change rate. That is, the gas generation level determining unit 130 may determine the internal gas generation level of the battery cell based on the resistance change rate calculated by the resistance change rate calculating unit 120.

Specifically, the gas generation level determining unit 130 may be configured to determine the internal gas generation level of the battery cell based on a region to which the calculated resistance change rate belongs among preset reference change rate regions.

For example, the reference change rate regions may be preset as a first region, a second region, and a third region. Hereinafter, it will be described that the reference change rate regions are set as the first to third regions, but it should be noted that the reference change rate regions may be set to be more subdivided.

Preferably, the reference change rate regions may be configured to be preset according to the internal gas generation level as a first region less than a first reference resistance change rate, a second region equal to or greater than the first reference resistance change rate and less than a second reference resistance change rate, and a third region equal to or greater than the second reference resistance change rate.

The gas generation level determining unit 130 may determine a region to which the calculated resistance change rate belongs by substituting the calculated resistance change rate into the reference change rate regions. That is, the gas generation level determining unit 130 may determine a region to which the calculated resistance change rate belongs among the reference change rate regions.

For example, the gas generation level determining unit 130 may be configured to determine that the internal gas generation level is normal when the calculated resistance change rate belongs to the first region, and determine that the internal gas generation level is warning when the calculated resistance change rate belongs to the second region, and determine that the internal gas generation level is danger when the calculated resistance change rate belongs to the third region.

The state diagnosing unit 140 may be configured to diagnose the state of the battery cell according to the determined internal gas generation level. That is, the state diagnosing unit 140 may diagnose the state of the battery cell according to the internal gas generation level determined by the gas generation level determining unit 130.

For example, in the previous embodiment, the gas generation level determining unit 130 may determine the internal gas generation level as normal, warning, or danger based on the calculated resistance change rate. To correspond to this, the state diagnosing unit 140 may diagnose the state of the battery cell as a normal state, a warning state or an unusable state.

Specifically, the state diagnosing unit 140 may be configured to diagnose the state of the battery cell as a normal state when the internal gas generation level is determined as normal.

In addition, the state diagnosing unit 140 may be configured to diagnose the state of the battery cell as a warning state when the internal gas generation level is determined as warning. Preferably, the state diagnosing unit 140 may be configured to reduce at least one of a maximum allowable temperature and a maximum allowable SOC of the battery cell in order to suppress generation of an internal gas of the battery cell. That is, for the corresponding battery cell, at least one of the maximum allowable temperature and the maximum allowable SOC may be set to be reduced.

In addition, the state diagnosing unit 140 may be configured to diagnose the state of the battery cell as an unusable state when the internal gas generation level is determined as danger.

That is, the battery diagnosis apparatus 100 according to an embodiment of the present disclosure has an advantage of diagnosing the internal gas generation level and state of the battery cell from the resistance change rate of the ohmic resistance of the battery cell in a non-destructive manner based on the correlation between the ohmic resistance of the battery cell and the internal gas generation level of the battery cell. For example, if the amount of internal gas generated by the battery cell is increased, the electron transporting power inside the electrode is reduced due to the internal gas, and the ohmic resistance of the battery cell may be sensitively increased due to the decrease in the ionic conductivity of the electrolyte. Therefore, the battery diagnosis apparatus 100 may diagnose the gas generation level and state of the battery cell based on the resistance change rate of the ohmic resistance by considering the relationship between the ohmic resistance and the amount of generated internal gas.

For example, when diagnosing the state of a plurality of battery cells collected for reuse, the battery diagnosis apparatus 100 according to an embodiment of the present disclosure may be used. The battery diagnosis apparatus 100 may obtain a plurality of impedance profiles for each of the plurality of battery cells, and non-destructively diagnose the internal gas generation level and state of each of the plurality of battery cells based on the plurality of obtained impedance profiles. A battery cell diagnosed as a normal state may be reused without additional setting change, but a battery cell diagnosed as a warning state may be reused after setting to reduce at least one of the maximum allowable temperature and the maximum allowable SOC. In addition, a battery cell diagnosed as an unusable state may not be reused. According to an embodiment of the present disclosure, since the internal gas generation level and state of the battery cell may be quickly and easily diagnosed using the ohmic resistance of the battery cell as described above, there is an advantage that the efficiency of diagnosing the state of the battery cell may be improved.

Meanwhile, the battery diagnosis apparatus 100 may further include a storage unit (not shown). The storage unit may store programs, data and the like required for operating the battery diagnosis apparatus 100. That is, the storage unit may store data necessary for operation and function of each component of the battery diagnosing apparatus 100, data generated in the process of performing the operation or function, or the like. The storage unit is not particularly limited in its kind as long as it is a known information storage means that can record, erase, update and read data. As an example, the information storage means may include random access memory (RAM), flash memory, read-only memory (ROM), electrically erasable programmable read-only memory (EEPROM), registers, and the like. In addition, the storage unit may store program codes in which processes executable by each component of the battery diagnosis apparatus 100 are defined.

Referring to FIG. 1, the battery diagnosis apparatus 100 may further include a measuring unit 150 and an SOC estimating unit 160.

The measuring unit 150 may be configured to measure at least one of temperature, voltage and current of the battery cell.

Preferably, the measuring unit 150 may measure the temperature of the battery cell. In addition, the measuring unit 150 may measure at least one of voltage and current of the battery cell.

More preferably, the measuring unit 150 may measure all of temperature, voltage and current of the battery cell.

The SOC estimating unit 160 may be configured to estimate the SOC of the battery cell based on at least one of the measured voltage and current.

For example, the SOC estimating unit 160 may estimate the SOC of the battery cell using an extended Kalman filter (EKF). As another example, the SOC estimating unit 160 may estimate the SOC of the battery cell using a current counting method (Coulomb counting, Ampere counting) for counting the current of the battery cell measured by the measuring unit 150. Since the SOC estimating unit 160 estimates the SOC of the battery cell using a well-known method, a detailed description thereof will be omitted.

The ohmic resistance determining unit 110 may be configured to select at least one impedance profile satisfying a predetermined condition among the plurality of impedance profiles based on the temperature of the battery cell measured by the measuring unit 150 and the SOC of the battery cell estimated by the SOC estimating unit 160.

Specifically, the ohmic resistance determining unit 110 may select only an impedance profile in which the temperature and SOC of the battery cell satisfy predetermined conditions among the plurality of impedance profiles. For example, even if the ohmic resistance determining unit 110 obtains 100 impedance profiles, if 10 impedance profiles satisfy the predetermined conditions for the temperature and SOC of the battery cell, the ohmic resistance determining unit 110 may select only the corresponding 10 impedance profiles.

In addition, the resistance change rate calculating unit 120 may be configured to calculate the resistance change rate based on the impedance profile selected by the ohmic resistance determining unit 110.

For example, in the former embodiment, when the ohmic resistance determining unit 110 selects only 10 impedance profiles among 100 impedance profiles, the ohmic resistance determining unit 110 may determine the ohmic resistance of the battery cell in each of the 10 impedance profiles. In addition, the resistance change rate calculating unit 120 may calculate a resistance change rate between the determined 10 ohmic resistances.

Hereinafter, a condition in which the ohmic resistance determining unit 110 selects an impedance profile will be described in more detail with reference to FIGS. 3 and 4.

Figure 4:
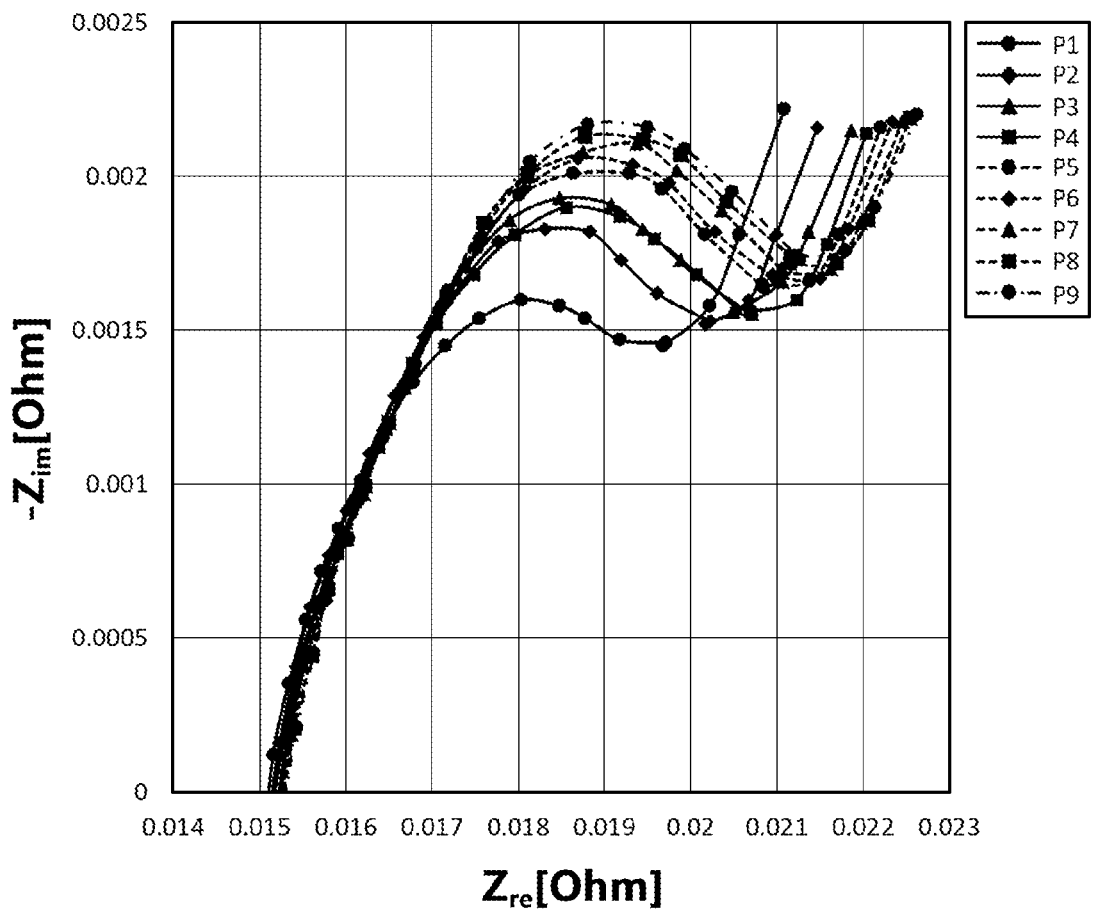
FIG. 4 is a diagram schematically showing a plurality of other impedance profiles according to an embodiment of the present disclosure.

FIG. 4 is a diagram schematically showing a plurality of other impedance profiles according to an embodiment of the present disclosure.

The ohmic resistance determining unit 110 may be configured to select an impedance profile in which the temperature of the corresponding battery cell is equal to or higher than a reference temperature and an SOC of the corresponding battery cell is equal to or greater than a reference SOC, among the plurality of impedance profiles.

In general, when the SOC of the battery cell is equal to or greater than a certain level, the amount of internal gas generated by the battery cell may increase as the temperature of the battery cell increases. That is, when the SOC of the battery cell is less than the certain level, the amount of internal gas generated by the battery cell itself is small, and thus the amount of internal gas generated by the battery cell may not increase even if the battery cell has high temperature. Therefore, the ohmic resistance of the battery cell related to the amount of internal gas generated by the battery cell may be increased when both the temperature and the SOC of the battery cell satisfy predetermined conditions.

Specifically, the plurality of impedance profiles shown in FIG. 3 are impedance profiles generated when the temperature of the battery cell is equal to or higher than the reference temperature and the SOC of the battery cell is equal to or greater than the reference SOC.

For example, in the embodiment of FIG. 3, the reference temperature may be 40° C., the temperature of the battery cell may be 55° C., the reference SOC may be 90%, and the SOC of the battery cell may be 100%. That is, the plurality of impedance profiles shown in FIG. 3 are impedance profiles generated at a constant cycle for a battery cell at high temperature and in a fully charged state.

Conversely, the plurality of impedance profiles shown in FIG. 4 are impedance profiles generated when the temperature of the battery cell is equal to or higher than the reference temperature but the SOC of the battery cell is less than the reference SOC.

For example, in the embodiment of FIG. 4, the reference temperature may be 40° C., the temperature of the battery cell may be 55° C., the reference SOC may be 90%, and the SOC of the battery cell may be 0%. That is, the plurality of impedance profiles shown in FIG. 4 are impedance profiles generated at a constant period for a battery cell at a high temperature and in a fully discharged state.

In addition, the plurality of impedance profiles of FIGS. 3 and 4 are profiles for the impedance measured by outputting the same current to the battery cell. That is, the difference between the impedance profiles of FIGS. 3 and 4 is the SOC of the battery cell at the time of measurement.

Referring to FIG. 3, it may be clearly seen that the ohmic resistance of the battery cell increases as time elapses (e.g., as the process progresses from the first impedance profile P1 to the ninth impedance profile P9).

On the other hand, referring to FIG. 4, it may be confirmed that the ohmic resistance of the battery cell is maintained within an approximate range even if time elapses. This is, in the case of FIG. 4, since the SOC of the battery cell is 0%, the internal gas of the battery cell itself is not generated or the amount of gas generation itself is small. Thus, even if the temperature of the battery cell is high, the ohmic resistance of the battery cell may be maintained within an approximate range.

That is, in order to diagnose the state of the battery cell in consideration of the correlation between the internal gas generation level of the battery cell and the resistance change rate of the ohmic resistance of the battery cell, the temperature of the battery cell at the time of measurement of the impedance must be equal to or higher than the reference temperature, and the SOC of the battery cell must also be equal to or greater than the reference SOC.

For example, according to the embodiment of FIG. 4, even when the battery cell is seriously degraded and is in an unusable state, since the resistance change rate of the ohmic resistance is very small, there is a problem that the internal gas generation level may be erroneously diagnosed as normal and the state of the battery cell may be erroneously diagnosed as a normal state. Specifically, according to the embodiment of FIG. 4, since the internal gas itself of the battery cell is not generated or the amount itself is small, the resistance change rate of the ohmic resistance is calculated low, and the battery cell may be erroneously diagnosed as in a normal state according to the low calculated resistance change rate.

Therefore, the battery diagnosis apparatus 100 according to an embodiment of the present disclosure has an advantage of more accurately diagnosing the internal gas generation level and state of the battery cell by considering both the temperature and the SOC of the battery cell at the time of measurement of the impedance.

Referring to FIG. 1, the battery diagnosis apparatus 100 may further include a charge transfer resistance determining unit 170.

The charge transfer resistance determining unit 170 may be configured to determine a charge transfer resistance (Rct) in each of the plurality of impedance profiles.

Here, the charge transfer resistance refers to a resistance generated in an oxidation reaction or a reduction reaction of lithium ions at the electrode material interface. It should be noted that since the charge transfer resistance is a well-known factor, a description of the charge transfer resistance itself will be omitted.

As described above, when the value of the imaginary part (−Zim) in the impedance profile is 0, the resistance value of the real part (Zre) is the ohmic resistance (Ro) of the battery cell, which may be determined by the ohmic resistance determining unit 110.

Alternatively, the charge transfer resistance (Rct) may be determined based on the difference between the ohmic resistance (Ro) of the battery cell and the resistance value ($R_{TP}$) of a target peak TP in the impedance profile. Due to the characteristics of the impedance profile, the resistance value ($R_{TP}$) of the target peak TP is always greater than the ohmic resistance (Ro), so the charge transfer resistance may be determined according to the formula of "the resistance value of the target peak TP ($R_{TP}$)–the ohmic resistance (Ro)".

That is, the charge transfer resistance determining unit 170 may determine the target peak TP in each of the plurality of impedance profiles, and determine the charge transfer resistance of each impedance profile based on the difference between the resistance value ($R_{TP}$) of the determined target peak TP and the ohmic resistance (Ro) determined by the ohmic resistance determining unit 110.

For example, in the embodiment of FIG. 2, the impedance profile may include a target peak TP. Specifically, the target peak TP may be a peak in which an instantaneous change rate of the imaginary part (-Zim) with respect to the real part (Zre) in the impedance profile is 0 and which has a downward convex open shape. That is, based on the target peak TP, as the resistance value of the real part (Zre) increases, the instantaneous change rate of the imaginary part (-Zim) with respect to the real part (Zre) may change from negative to positive.

For example, in the embodiment of FIG. 3, the charge transfer resistance determining unit 170 may determine the charge transfer resistance for each of the first to ninth impedance profiles P1 to P9. Here, the charge transfer resistance of the first impedance profile P1 may be smallest, and the charge transfer resistance of the ninth impedance profile P9 may be largest. That is, the magnitudes of the charge transfer resistances of the first to ninth impedance profiles P1 to P9 may be sequentially increased.

The resistance change rate calculating unit 120 may be configured to further calculate a charge transfer resistance change rate between the plurality of determined charge transfer resistances.

That is, the resistance change rate calculating unit 120 may calculate a resistance change rate for the plurality of ohmic resistances determined by the ohmic resistance determining unit 110, and calculate a charge transfer resistance change rate for the plurality of charge transfer resistances determined by the charge transfer resistance determining unit 170.

The state diagnosing unit 140 may be configured to further diagnose the state of the battery cell based on a result of comparing the calculated charge transfer resistance change rate and the reference resistance value.

Specifically, the state diagnosing unit 140 may be configured to diagnose the state of the battery cell as a normal state when the calculated charge transfer resistance change rate is less than the reference resistance value.

In addition, the state diagnosing unit 140 may be configured to diagnose the state of the battery cell as a warning state when the calculated charge transfer resistance change rate is equal to or greater than the reference resistance value. In addition, the state diagnosing unit 140 may be configured to reduce the maximum allowable C-rate for charging and discharging of the battery cell. Here, the C-rate (Current rate) means a charge/discharge rate of the battery cell.

That is, when the state of the battery cell is diagnosed as a warning state, the state diagnosing unit 140 may reduce the maximum allowable C-rate of the battery cell in order to reduce the charge transfer resistance. Accordingly, the maximum allowable values of the charging C-rate and the discharging C-rate of the battery cell may be reduced.

For example, when diagnosing the state of a plurality of battery cells collected for reuse, the battery diagnosis apparatus 100 according to an embodiment of the present disclosure may further consider the charge transfer resistance as well as the ohmic resistance. A battery cell diagnosed as a normal state based on the charge transfer resistance may be reused without additional setting change, but a battery cell diagnosed as a warning state may be reused after the maximum allowable C-rate is set to be reduced.

As such, the battery diagnosis apparatus 100 according to an embodiment of the present disclosure may diagnose the state of the battery cell based on the ohmic resistance of the battery cell determined from the impedance profile, and also diagnose the state of the battery cell based on the charge transfer resistance determined from the impedance profile. That is, since the battery diagnosis apparatus 100 may diagnose the state of the battery cell in two ways, there is an advantage that the state of the battery cell may be diagnosed more accurately.

Figure 5:
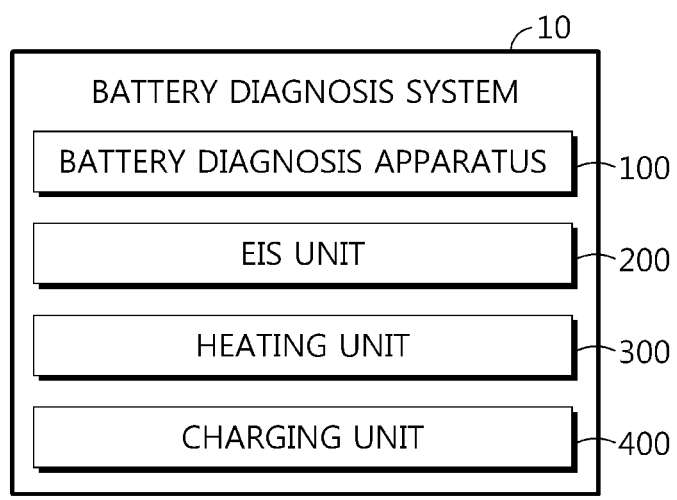
FIG. 5 is a diagram schematically showing a battery diagnosis system according to another embodiment of the present disclosure.

FIG. 5 is a diagram schematically showing a battery diagnosis system 10 according to another embodiment of the present disclosure.

Referring to FIG. 5, the battery diagnosis system 10 may include a battery diagnosis apparatus 100 and an Electrochemical Impedance Spectroscopy (EIS) unit 200.

The EIS unit 200 may be configured to output an AC current to the battery cell and generate an impedance profile representing the impedance of the battery cell as a corresponding relationship between the real part (Zre) and the imaginary part (-Zim) according to the output result of the AC current.

Specifically, the EIS unit 200 may be configured to perform EIS. Therefore, the EIS unit 200 may apply a minute AC current to the battery cell to measure the impedance of the battery cell, and generate an impedance profile representing the impedance as a corresponding relationship between the real part (Zre) and the imaginary part (-Zim).

The EIS unit 200 may be configured to output the generated impedance profile to the battery diagnosis apparatus 100.

For example, the EIS unit 200 may transmit the generated impedance profile to the ohmic resistance determining unit 110 and the charge transfer resistance determining unit 170 of the battery diagnosis apparatus 100.

As another example, the EIS unit 200 may transmit the generated impedance profile to the storage unit of the battery diagnosis apparatus 100. In this case, the ohmic resistance determining unit 110 and the charge transfer resistance determining unit 170 may access the storage unit to acquire the impedance profile generated by the EIS unit 200.

Also, referring to FIG. 5, the battery diagnosis system 10 may further include a heating unit 300 and a charging unit 400.

The heating unit 300 may be configured to increase the temperature of the battery cell so that the temperature of the battery cell is equal to or higher than a reference temperature.

The charging unit 400 may be configured to charge the battery cell such that the SOC of the battery cell is equal to or greater than the reference SOC.

Preferably, the operation of the heating unit 300 and the charging unit 400 may be controlled by a battery management system. For example, the operation of the heating unit 300 and the charging unit 400 may be controlled by the state diagnosing unit 140.

As described above, referring to FIG. 3, when the temperature of the battery cell is equal to or higher than the reference temperature and the SOC of the battery cell is equal to or greater than the reference SOC, the ohmic resistance of the battery cell may be gradually increased in the plurality of impedance profiles.

Therefore, since the temperature of the battery cell becomes equal to or higher than the reference temperature by the heating unit 300 and the SOC of the battery cell becomes equal to or greater than the reference SOC by the charging unit 400, the impedance profile generated by the EIS unit 200 under this condition may be selected as an impedance profile used to diagnose the state of the battery cell. That is, based on the impedance profile generated in this condition, the state of the battery cell may be diagnosed.

Therefore, the battery diagnosis system 10 may diagnose the state of the battery cell based on the corresponding impedance profile only when the temperature and SOC of the battery cell satisfy the predetermined condition, so the accuracy and reliability of the state diagnosis of the battery cell may be high.

The battery diagnosis apparatus 100 according to the present disclosure may be applied to a BMS (Battery Management System). That is, the BMS according to the present disclosure may include the battery diagnosis apparatus 100 described above. In this configuration, at least some components of the battery diagnosis apparatus 100 may be implemented by supplementing or adding functions of the configuration included in the conventional BMS.

In addition, the battery diagnosis apparatus 100 according to the present disclosure may be provided to a battery pack 1. That is, the battery pack 1 according to the present disclosure may include the above-described battery diagnosis apparatus 100 and at least one battery cell. In addition, the battery pack 1 may further include electrical equipment (a relay, a fuse, etc.) and a case.

Figure 6:
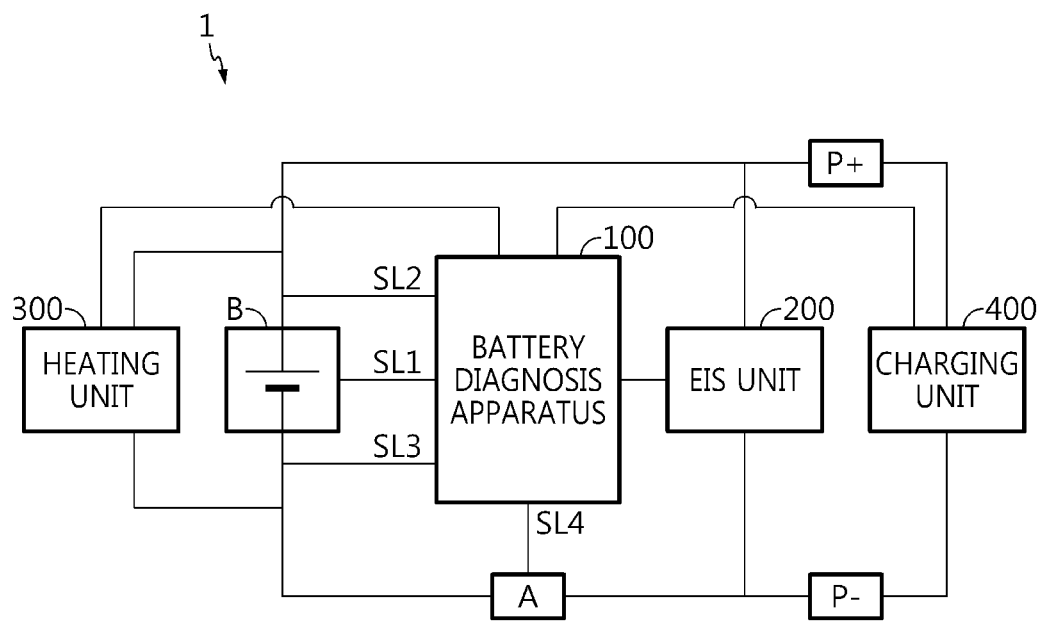
FIG. 6 is a diagram schematically showing an exemplary configuration of a battery pack according to still another embodiment of the present disclosure.

FIG. 6 is a diagram schematically showing an exemplary configuration of a battery pack 1 according to still another embodiment of the present disclosure. Referring to FIG. 6, the battery pack 1 may include a battery diagnosis apparatus 100, an EIS unit 200, a heating unit 300, and a charging unit 400.

For example, in the embodiment of FIG. 6, the battery diagnosis apparatus 100 may be connected to first to fourth sensing lines SL1 to SL4. Preferably, the first to fourth sensing lines SL1 to SL4 may be connected to the measuring unit 150 of the battery diagnosis apparatus 100.

The measuring unit 150 may measure the temperature of the battery cell B through the first sensing line SL1.

In addition, the measuring unit 150 may measure a positive electrode voltage of the battery cell B through the second sensing line SL2 and measure a negative electrode voltage of the battery cell B through the third sensing line SL3. In addition, the measuring unit 150 may measure the voltage of the battery cell B by calculating a difference between the measured positive electrode voltage and negative electrode voltage of the battery cell B.

Also, the measuring unit 150 may be connected to a current measuring element A through the fourth sensing line SL4. Here, the current measuring element A may be a current system or a shunt resistor. Therefore, the measuring unit 150 may measure the current of the battery cell B through the fourth sensing line SL4. FIG. 6 shows an embodiment in which the current measuring element A is provided between a negative electrode of the battery cell B and a negative electrode terminal P– of the battery pack 1 as a preferred embodiment, but the current measuring element A may also be provided between a positive electrode of the battery cell B and a positive electrode terminal P+ of the battery pack 1.

One end of the EIS unit 200 may be connected between the positive electrode terminal P+ of the battery pack 1 and the positive electrode of the battery cell B, and the other end may be connected between the negative electrode terminal P– of the battery pack 1 and the negative electrode of the battery cell B. In addition, the EIS unit 200 may measure the impedance of the battery cell B after outputting a minute AC current. Thereafter, the EIS unit 200 may generate an impedance profile of the battery cell B and transmit it to the battery diagnosis apparatus 100.

One end of the heating unit 300 may be connected to the positive electrode of the battery cell B, and the other end may be connected to the negative electrode of the battery cell B. In addition, the operation of the heating unit 300 is controlled by the battery diagnosis apparatus 100 (particularly, the state diagnosing unit 140), and when the heating unit 300 is operated, the temperature of the battery cell B may increase.

One end of the charging unit 400 may be connected to the positive electrode terminal P+ of the battery pack 1, and the other end may be connected to the negative electrode terminal P– of the battery pack 1. In another embodiment, one end of the charging unit 400 may be directly connected to the positive electrode of the battery cell B, and the other end may be directly connected to the negative electrode of the battery cell B, similarly to the heating unit 300. The operation of the charging unit 400 may be controlled by the battery diagnosis apparatus 100 (particularly, the state diagnosing unit 140), and when the charging unit 400 is operated, the battery cell B may be charged.

Figure 7:
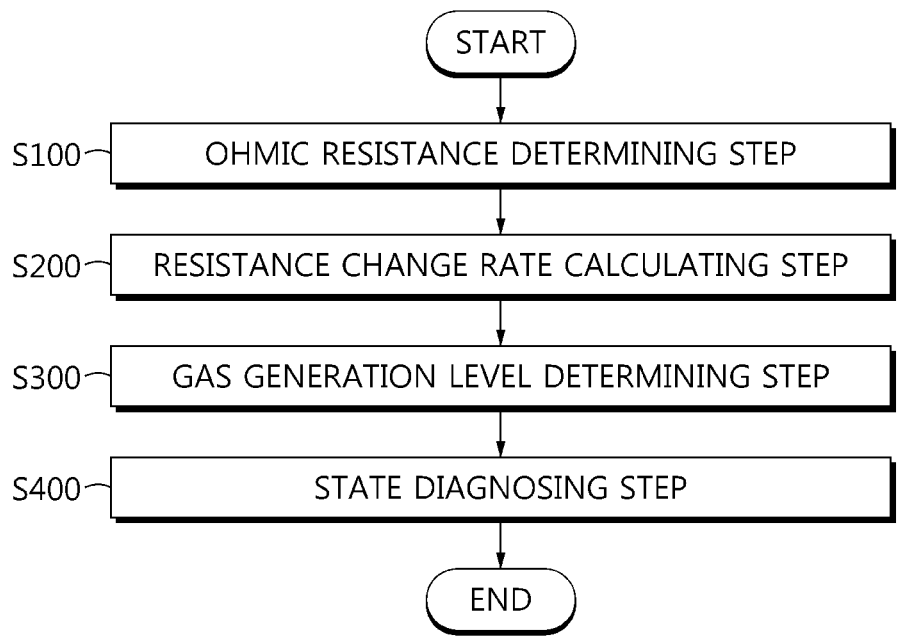
FIG. 7 is a diagram showing a battery diagnosing method according to still another embodiment of the present disclosure.

FIG. 7 is a diagram showing a battery diagnosing method according to still another embodiment of the present disclosure.

Here, each step of the battery diagnosis method may be performed by the battery diagnosis apparatus 100. Hereinafter, for convenience of explanation, content overlapping with the previously described content will be briefly described or omitted.

The battery diagnosing method may include an ohmic resistance determining step (S100), a resistance change rate calculating step (S200), a gas generation level determining step (S300), and a state diagnosing step (S400).

The ohmic resistance determining step (S100) is a step of determining an ohmic resistance of the battery cell B in each of a plurality of impedance profiles generated at different time points for the battery cell B, and may be performed by the ohmic resistance determining unit 110.

For example, in the embodiment of FIG. 4, the ohmic resistance determining unit 110 may obtain first to ninth impedance profiles P1 to P9. In addition, the ohmic resistance determining unit 110 may determine the ohmic resistance of the battery cell B in each of the first to ninth impedance profiles P1 to P9.

The resistance change rate calculating step (S200) is a step of calculating a resistance change rate between the plurality of determined ohmic resistances, and may be performed by the resistance change rate calculating unit 120.

For example, in the embodiment of FIG. 4, when the ohmic resistance is determined in each of the first to ninth impedance profiles P1 to P9 by the ohmic resistance determining unit 110, the resistance change rate calculating unit 120 may calculate a resistance change rate for the 9 ohmic resistances.

The gas generation level determining step (S300) is a step of determining an internal gas generation level of the battery cell B based on the calculated resistance change rate, and may be performed by the gas generation level determining unit 130.

The gas generation level determining unit 130 may determine an internal gas generation level corresponding to a region to which the calculated resistance change rate belongs by substituting the resistance change rate calculated by the resistance change rate calculating unit 120 to a preset reference change rate region.

The state diagnosing step (S400) is a step of diagnosing the state of the battery cell B according to the determined internal gas generation level, and may be performed by the state diagnosing unit 140.

The state diagnosing unit 140 may diagnose the state of the battery cell B to correspond to the internal gas generation level of the battery cell B determined by the gas generation level determining unit 130.

For example, if the internal gas generation level is normal, the state diagnosing unit 140 may diagnose that the state of the battery cell B is a normal state. If the internal gas generation level is warning, the state diagnosing unit 140 may diagnose that the state of the battery cell B is a warning state. If the internal gas generation level is danger, the state diagnosing unit 140 may diagnose that the state of the battery cell B is an unusable state.

The embodiments of the present disclosure described above may not be implemented only through an apparatus, a method and a system, but may be implemented through a program that realizes a function corresponding to the configuration of the embodiments of the present disclosure or a recording medium on which the program is recorded. The program or recording medium may be easily implemented by those skilled in the art from the above description of the embodiments.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

REFERENCE SIGNS

1: battery pack
10: battery diagnosis system
100: battery diagnosis apparatus
110: ohmic resistance determining unit
120: resistance change rate calculating unit
130: gas generation level determining unit
140: state diagnosing unit
150: measuring unit
160: SOC estimating unit
170: charge transfer resistance determining unit
200: EIS unit
300: heating unit
400: charging unit
B: battery cell

What is claimed is:
1. A battery diagnosis system, comprising:
a battery diagnosis apparatus, comprising:
memory having programmed thereon instructions that, when executed by the controller, cause the battery diagnosis apparatus to:
calculate a resistance change rate between ohmic resistances of a battery cell at different times, wherein the ohmic resistances are determined from respective impedance profiles of the battery cell generated at the different times;
determine an internal gas generation level of the battery cell based on the calculated resistance change rate; and
diagnose a state of the battery cell according to the determined internal gas generation level, and
a second apparatus configured to heat and/or charge the battery cell.

2. The battery diagnosis system according to claim 1, wherein the instructions are configured to cause the battery diagnosis apparatus to:
determine to which of a plurality of preset reference change rate regions the calculated resistance change rate belongs, wherein the plurality of preset reference change rate regions include a first region that is less than a first reference resistance change rate, a second region that is equal to or great than the first reference resistance change rate and less than a second reference resistance change rate, and a third region that is equal to or greater than the second reference resistance change rate; and
determine the internal gas generation level of the battery cell based on the determined preset reference change rate region to which the calculated resistance change rate belongs.

3. The battery diagnosis system according to claim 2, wherein the instructions are configured to cause the battery diagnosis apparatus to:
determine that the internal gas generation level is normal in response to the calculated resistance change rate belonging to the first region;
determine that the internal gas generation level is at a warning level in response to the calculated resistance change rate belonging to the second region; and
determine that the internal gas generation level is at a danger level in response to the calculated resistance change rate belonging to the third region.

4. The battery diagnosis system according to claim 3, wherein the instructions are configured to cause the battery diagnosis apparatus to:
diagnose the state of the battery cell as a normal state in response to the internal gas generation level being normal;
diagnose the state of the battery cell as a warning state in response to the internal gas generation level being at the warning level and reduce at least one of a maximum allowable temperature or a maximum allowable state of charge (SOC); and
diagnose that the state of the battery as an unusable state in response to the internal gas generation level being at the danger level.

5. The battery diagnosis system according to claim 1, wherein the battery diagnosis apparatus further comprises:
a sensor configured to measure a temperature of the battery cell and at least one of a voltage or current of the battery cell, and
wherein the instructions are configured to cause the battery diagnosis apparatus to;
estimate a SOC of the battery cell based on at least one of the measured voltage or current;
select at least one impedance profile from among the impedance profiles based on the temperature and the SOC of the battery cell, wherein the selected at least one impedance profile satisfies a predetermined condition; and
calculate the resistance change rate based on the selected at least one impedance profile.

6. The battery diagnosis system according to claim 5, wherein in the selected at least one impedance profile the temperature of the battery cell is equal to or higher than a reference temperature and the SOC of the battery cell is equal to or greater than a reference SOC.

7. The battery diagnosis system according to claim 1, wherein the instructions are configured to cause the battery diagnosis apparatus to:
determine a respective charge transfer resistance for each of the impedance profiles;
calculate a charge transfer resistance change rate between the respective determined charge transfer resistances of corresponding impedance profiles;
compare the calculated charge transfer resistance change rate and a refence resistance value; and
diagnose the state of the battery cell based on the comparison.

8. The battery diagnosis system according to claim 7, wherein the instructions are configured to cause the battery diagnosis apparatus to:
diagnose that the state of the battery cell is a normal state in response to the calculated charge transfer resistance change rate being equal to or greater than the reference resistance value;
diagnose that the state of the battery cell is a warning state in response to the calculated charge transfer resistance change rate being equal to or greater than the reference resistance value; and
reduce a maximum allowable current rate (C-rate) for charging and discharging of the battery cell in response to the state of the battery cell being the warning state.

9. The battery diagnosis system according to claim 1, further comprising:
an Electrochemical Impedance Spectroscopy (EIS) instrument configured to:
output an AC current to the battery cell;
generate the impedance profiles, each impedance profile representing a relationship between real and imaginary parts of an impedance of the battery cell while the AC current is being output; and
transmit the generated impedance profile to the battery diagnosis apparatus.

10. The battery diagnosis system according to claim 1, wherein the second apparatus comprises:
a heater configured to increase a temperature of the battery cell up to or higher than a reference temperature; and/or
a charger configured to charge the battery cell up to or greater than a reference SOC.

11. A battery pack, comprising the battery diagnosis system according to claim 1.

12. A battery diagnosing method, comprising:
calculating, by a battery diagnosis apparatus, a resistance change rate between ohmic resistances of a battery cell at different times, wherein the ohmic resistances are determined from respective impedance profiles of the battery cell generated at the different times;
determining, by the battery diagnosis apparatus, an internal gas generation level of the battery cell based on the calculated resistance change rate;
diagnosing, by the battery diagnosis apparatus, a state of the battery cell according to the determined internal gas generation level; and
heating and/or charging the battery cell, by a second apparatus.

* * * * *